INVENTOR
FRANK R. SALISBURY

BY *Larson and Taylor*

ATTORNEYS

United States Patent Office 3,485,268
Patented Dec. 23, 1969

3,485,268
PRESSURE OPERATED EXPANSION VALVE
Frank R. Salisbury, Rochester, N.Y., assignor to Eastman Kodak Company, Rochester, N.Y., a corporation of New Jersey
Filed May 22, 1967, Ser. No. 639,995
Int. Cl. F16k 31/12, 31/36
U.S. Cl. 137—608      7 Claims

ABSTRACT OF THE DISCLOSURE

A fluid control valve having a rigid tube which is surrounded in turn by a tubular resilient liner and an annular flow chamber. Pressure is applied to the inside of the liner to rapidly expand a local portion of the liner into the relatively short annular flow chamber to rapidly stop fluid flow.

BACKGROUND OF THE INVENTION

This invention pertains to pressure operated expansion valves for the control of low pressure fluid flow. More particularly the invention is directed to an improved expansion valve which is useful in compact flow systems requiring rapid control, high degrees of sanitation, and a minimum amount of bubble formation.

Sanitary valves are well known in the prior art, as are pressure operated valves. A bladder or balloon type valve is particularly useful in sanitary operations because there is no conventional valve-stem opening containing oil packings and the like between the control system and the controlled fluid. Thus, it is relatively simple to prevent fluid leakage during the actuation of the valve and contamination of the fluid controlled by the valve is substantially reduced or eliminated. However, when using sanitary valves for control purposes, it is often particularly desirable to have fast acting controls. Several bladder or balloon valves such as those shown in the U.S. Patent No. 329,773 do not operate as rapidly as sometimes desired because a large flow of control fluid is necessary to effect enough expansion of the valve to block the passage of the controlled fluid. Mechanically operated expansion valves, as exemplified by U.S. Patent No. 2,812,154, also tend to operate more slowly than sometimes desired because of the substantial motion necessary in the control mechanism to effect closing of the valve. Further valves of the latter type, when rapidly operated, such as by solenoid operated levers, have a greater tendency to damage the resilient valve liner during the abrupt termination of the closing motion. The sanitary valve of the present invention may be operated faster than the valves of the prior art with substantially reduced chances of valve damage.

SUMMARY

An improved sanitary valve has been devised which comprises a tubular resilient liner which is sealed in a valve body. When controlling fluid pressure is applied to the inside of the liner, a first exterior peripheral portion of the liner expands, rapidly filling up an annular flow chamber which surrounds the exterior of the liner. The exterior peripheral portions of the liner which border the first portion are in sealing engagement with the valve body when the liner assumes its expanded and relaxed shape. Fluid flow through the annular flow chamber is stopped when the first portion is in sealing engagement with the valve body. The valve of the present invention can thus be controlled more rapidly and reliably than those in the prior art described above due to the substantial reduction in movement required by the liner and the low-inertia, pressure-operating technique. Rapid control is facilitated when the first portion of the liner is relatively short compared to the length of the liner. The valve is designed for "on-off" service using a pressure signal to shut off flows through the valve. Since the valves can be made very small and are designed so that one cover plate on the top and bottom can contain several valve units, they are well suited for compact, multiple flow systems. Moreover, the inherent simplicity of a sanitary valve embodying the present invention aids greatly in making it easily cleanable by either purging or disassembly. This feature enhances the valve's usefulness in a system which must be kept free of contamination. Further, the simplicity of the flow path in the valve of the present invention helps to reduce the possibility of bubble formation in the valve, a problem which is critical in certain control systems.

DESCRIPTION OF THE PREFERRED EMBODIMENT

Figure 1:
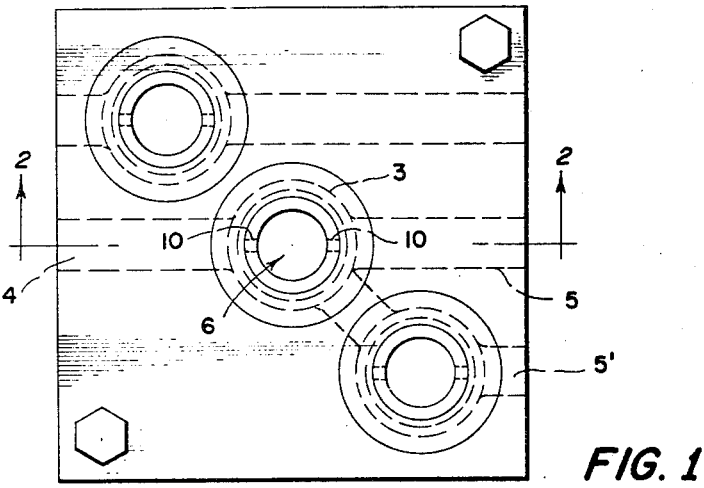
FIGURE 1 is a plan view of a pressure-operable sanitary valve which embodies the present invention.
Figure 2:
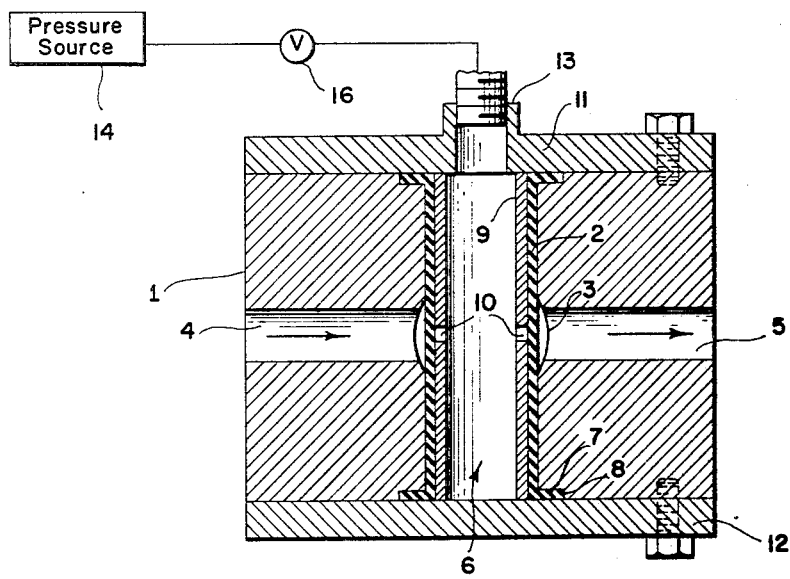
FIGURE 2 is the vertical section of the valve taken along 2—2 in FIGURE 1 and showing a relaxed liner and means to apply fluid pressure to operate the valve.

Referring to FIGURES 1 and 2 of the drawings, the valve shown has a rigid valve body 1 surrounding a resilient tubular liner 2. The valve body 1, which may be of a suitable metal or plastic, is provided with an annular flow chamber 3 which communicates with an inlet opening 4 and an outlet opening 5 for the controlled fluid. Also communicating with the annular flow chamber 3 is a liner opening 6 in which the cylindrical liner is mounted. As shown in FIGURE 2, inlet and outlet openings 4 and 5, respectively, and liner opening 6 form intersecting channels in the valve body 1 and the intersection is shaped to define flow chamber 3. The liner 2 is supported in sealing engagement with the body on opposite sides of the intersection. The liner 2 is made of a resilient flexible material such as rubber or certain plastics and has integral exterior sealing flanges 7 to cooperate with seats 8 in the valve body 1 and are compressed into the seats 8 by cover plates 11 and 12. A rigid tube or insert 9 of metal or the like supports the interior of the tubular valve liner 2 thus preventing collapse thereof when the pressure therein is less than that of the fluid being controlled. As shown in FIGURE 2, the insert 9 also supports the liner 2 so that the peripheral exterior portions of the same which border upon the flow chamber 3, are in sealing engagement with the surrounding valve body 1. The insert or tube 9 is provided with perforations or holes 10 to allow any pressure therein to reach the liner 2 within the flow chamber 3. Cover plates 11 and 12 are suitably attached to spaced parallel faces of body 1 to hold the liner 2 and rigid tube 9 in place and prevent fluid leakage from the valve body. Cover plate 11 is provided with a pressure connection 13 defining an opening so that the variable pressure in the interior of the tubular liner 2 can be supplied from an air pressure source 14 by way of a valve 16 and the holes 10 in rigid tube 9.

Figure 3:
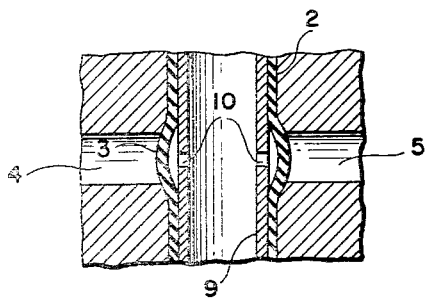
FIGURE 3 is a cut away view of the valve showing the liner in its expanded shape in the fluid flow chamber.

As is most clearly illustrated in FIGURE 2 of the drawing, the annular flow chamber 3 is shown to surround only a relatively short portion of the length of the tubular valve liner. As shown in FIGURE 3, the chamber's walls are also relatively closely spaced from the exterior of the liner and are transitionally shaped for ease of entry of the liner in its expanded shape. This arrangement of elements provides for the fast-acting control of the valve.

When, as in FIGURE 3, an expanding pressure is applied to the interior of the valve liner 2, only a short portion of the valve liner must expand in order to obtain cut off of the flow through the annular flow chamber 3. The use of the rigid tube 9 within the liner 2 to maintain a minimum diameter to limit expansion or contraction further aids in the selective rapid expansion of the valve liner in response to flow of control fluid through associated holes 10 in the desired area adjacent to the annular fluid flow chamber 3.

In operation, the valve of the preferred embodiment is very effective due to the simplified arrangement of elements. In the "on" position fluid flows into the inlet opening 4, then into the annular flow chamber 3 and then out through the outlet opening 5. In the "off" position, air pressure from the pressure source causes an exterior peripheral portion of the resilient valve liner 2 to expand locally like a balloon, thus rapidly filling the annular flow chamber 3 as shown in FIGURE 3. When the liner 2 assumes this expanded shape, fluid flow through the chamber 3 is prevented because of the sealing engagement of the exterior of the liner 2 with the valve body 1. When the pressure on the inside of the tubular liner is reduced, the resiliency of the liner and the pressure of the controlled fluid cause the liner to contract to its normal tubular configuration against the rigid tube 9 and fluid is again allowed to flow freely through the valve. The natural tendency of the valve liner to assume its original relaxed shape due to its resiliency makes it ideal for control of low pressure fluid flows. Rather than merely reducing the pressure in the tubular liner, a quicker and more positive valve control can be obtained by applying a vacuum to the inside of the liner through the connection 13.

FIGURE 1 further illustrates the efficient manner in which a plurality of expansion valves of the present invention can be closely grouped in a single valve body with one pair of cover plates to obtain a compact flow control system. Such a system can be easily cleaned or repaired by a relatively easy disassembly due to the inherent simplicity of the individual valves. FIGURE 1 further indicates the complex fluid flow switching patterns which can be obtained through the use of the valves of present invention. To facilitate such patterns the outlet opening from one fluid flow chamber can be arranged to communicate with the inlet opening of another fluid flow chamber.

By way of example inlet opening 4 of FIGURE 1 could conduct 40 cc. per second of a certain fluid and, depending upon the operation of the valve in the lower right hand portion of the block, the fluid flowing from the system could be separated between outlet openings 5 and 5¹ with respective flows of 30 and 10 cc. per second. Obviously, the fluid paths in a block the size of the one illustrated could be made more complex either by drilling and plugging or by lost wax casting techniques. The expansion valves in such a compact flow control system can be controlled by individual pressure sources and valves in a manner shown in FIGURE 2. Other suitable arrangements could be utilized, as for example programmed pressure signals for actuation of the sanitary valves. Programmed operation could accomplish various steps of a mixing process which has precise timing and quantity requirements.

I claim:

1. In a pressure operated sanitary valve having a rigid valve body with at least a pair of intersecting channels extending therethrough, a resilient tubular relaxed liner disposed in one of said channels and extending through the intersection, said intersection being shaped to define a flow chamber around said relaxed liner, and means for applying a control fluid pressure to the interior of the liner to expand the same to close the flow chamber, the improvement wherein:

the peripheral exterior of said relaxed liner is supported in sealing engagement with said body on opposite sides of said intersection.

2. In a pressure-operable sanitary valve having a rigid valve body surrounding a resilient tubular valve liner which assumes an expanded and a relaxed shape depending upon the fluid pressure therewithin, a flow chamber defined by said valve body and the exterior of said liner, and inlet and outlet openings defined by said body and communicating with said chamber, the improvement wherein:

when said liner is in said relaxed shape, a first exterior peripheral portion of said liner and said surrounding body are spaced to define said flow chamber, and the exterior peripheral portions of said liner which border said first exterior peripheral portion are in sealing engagement with said surrounding valve body; and when said liner is in said expanded shape, said first portion is in sealing engagement with said surrounding body to close said flow chamber.

3. The invention as claimed in claim 2, wherein said first portion is relatively short compared to the length of said liner.

4. The invention as claimed in claim 2 having:

a rigid perforate insert in said liner to prevent collapse thereof, to support the exterior portions which border said first portion in sealing engagement with said surrounding valve body, and to allow expansion and relaxation of said liner in response to fluid pressure within the same.

5. A compact multiple valve wherein a plurality of valves as defined in claim 4 are closely mounted in a single valve body and at least one outlet opening from a fluid flow chamber communicates with the inlet opening of at least one other fluid flow chamber.

6. The invention as claimed in claim 4 wherein said rigid valve body has spaced parallel faces adjacent respective ends of said valve liner, said liner has integral exterior sealing flanges on said ends which cooperate with sealing seats in said valve body, said flanges are compressed into said seats by cover plates mounted on said parallel faces, and one cover plate has an opening communicating with the interior of said rigid tube for the application of a fluid pressure to the interior of said valve liner.

7. A compact multiple valve wherein a plurality of valves as defined in claim 6 are closely mounted in a single valve body and covered by a single pair of cooperating cover plates.

References Cited

UNITED STATES PATENTS

| 2,627,874 | 2/1953 | Johnson | 251—5 |
| 2,575,240 | 11/1951 | Thompson | 137—608 |
| 2,582,877 | 1/1952 | Mekler | 251—175 |
| 2,931,387 | 4/1960 | Fleming | 137—608 |
| 2,995,335 | 8/1961 | Raftis | 251—5 |
| 3,038,488 | 6/1962 | Welch et al. | 251—61 XR |
| 3,115,329 | 12/1963 | Wing et al. | 251—175 XR |
| 3,207,469 | 9/1965 | Frame | 251—175 |
| 3,301,522 | 1/1967 | Ashbrook et al. | 251—5 XR |
| 3,371,677 | 3/1968 | Connolly | 251—5 XR |

SAMUEL SCOTT, Primary Examiner